(12) United States Patent
Laprade (10) Patent No.: US 9,511,621 B2
(45) Date of Patent: Dec. 6, 2016

(54) RELEASE FORMULATION FOR LABEL INCLUDING SYNTHETIC WAX

(75) Inventor: Jean-Paul Laprade, North Smithfield, RI (US)

(73) Assignee: Multi-Color Corporation, Batavia, OH (US)

( * ) Notice: Subject to any disclaimer, the term of this patent is extended or adjusted under 35 U.S.C. 154(b) by 292 days.

(21) Appl. No.: 13/021,265

(22) Filed: Feb. 4, 2011

(65) Prior Publication Data

US 2012/0201990 A1    Aug. 9, 2012

(51) Int. Cl.
| | |
|---|---|
| B32B 7/06 | (2006.01) |
| C08L 91/06 | (2006.01) |
| B44C 1/17 | (2006.01) |
| C09D 191/06 | (2006.01) |
| B32B 7/12 | (2006.01) |
| B32B 27/30 | (2006.01) |
| B32B 27/32 | (2006.01) |

(52) U.S. Cl.
CPC ........... *B44C 1/172* (2013.01); *B32B 7/06* (2013.01); *B32B 7/12* (2013.01); *B32B 27/306* (2013.01); *B32B 27/32* (2013.01); *C08L 91/06* (2013.01); *C09D 191/06* (2013.01); *B32B 2519/00* (2013.01); *C08L 2205/02* (2013.01); *C08L 2205/025* (2013.01); *Y10T 428/1419* (2015.01)

(58) Field of Classification Search
CPC ....... B44C 1/172; C08L 91/06; B32B 2519/00
USPC .................................. 428/343, 354
See application file for complete search history.

(56) References Cited

U.S. PATENT DOCUMENTS

| | | | |
|---|---|---|---|
| 1,972,459 A * | 9/1934 | Pungs et al. | 554/167 |
| 3,516,842 A * | 6/1970 | Klinker, Jr. et al. | 428/40.5 |
| 3,616,015 A | 10/1971 | Kingston | |
| 4,536,434 A | 8/1985 | Magnotta | |
| 4,555,436 A | 11/1985 | Geurtsen et al. | |
| 4,557,964 A * | 12/1985 | Magnotta | B44C 1/172 |
| | | | 428/187 |
| 4,581,266 A | 4/1986 | Magnotta | |
| 4,704,310 A | 11/1987 | Tighe et al. | |
| 4,927,709 A | 5/1990 | Parker et al. | |
| 4,935,300 A | 6/1990 | Parker et al. | |
| 5,766,731 A | 6/1998 | Stein et al. | |
| 6,376,069 B1 | 4/2002 | Bilodeau et al. | |
| 6,423,406 B1 | 7/2002 | Bilodeau | |
| 6,491,979 B1 * | 12/2002 | Yamaguchi et al. | 427/385.5 |

(Continued)

FOREIGN PATENT DOCUMENTS

| | | | |
|---|---|---|---|
| GB | 493766 A * | 5/1936 | |
| GB | 1130266 A | 10/1968 | |
| WO | 8001072 A1 | 5/1980 | |

OTHER PUBLICATIONS

Carnauba wax, http://en.wikipedia.org/wiki/Carnauba_wax#Production_and_Export.*

(Continued)

*Primary Examiner* — Victor Chang
(74) *Attorney, Agent, or Firm* — Wood Herron & Evans LLP (57) ABSTRACT

A heat transfer label comprising a support portion and a transfer portion for transfer of the transfer portion from the support portion to an article. Heat is applied to the support portion while the transfer portion is placed into contact with the article. The support portion comprises a release layer including a synthetic wax.

9 Claims, 3 Drawing Sheets

(56) References Cited

U.S. PATENT DOCUMENTS

| | | |
|---|---|---|
| 6,893,717 B1 | 5/2005 | Tsai et al. |
| 2003/0099827 A1* | 5/2003 | Shih et al. .................... 428/343 |
| 2007/0231514 A1* | 10/2007 | Filippino ............... B41M 5/035 |
| | | 428/32.81 |
| 2008/0311331 A1 | 12/2008 | Laprade et al. |

OTHER PUBLICATIONS

International Search Report in related PCT/US2012/023765, mailed May 22, 2012, 3 pgs.

* cited by examiner

RELEASE FORMULATION FOR LABEL INCLUDING SYNTHETIC WAX

FIELD OF THE INVENTION

The present invention relates generally to labels for various articles, and relates more specifically to heat transfer labels for articles, such as containers.

BACKGROUND OF THE INVENTION

This section is intended to introduce the reader to various aspects of art that may be related to various aspects of the present invention, which are described and/or claimed below. This discussion is believed to be helpful in providing the reader with background information to facilitate a better understanding of various aspects of the present invention. Accordingly, it should be understood that these statements are to be read in this light, and not as admissions of prior art.

As is well known, labels are commonly used in the decorating and/or labeling of commercial articles, such as, and without limitation, containers for beverages, essential oils, detergents, adverse chemicals, and health and beauty aids. One such type of label is a heat transfer label. Heat transfer labels are desirably resistant to abrasion and chemical effects in order to avoid a loss of label information and desirably possess good characteristics of adhesion to the articles to which they are affixed.

Heat transfer labels are multilayered laminates, with each layer having its own function. For example, heat transfer labels generally include an adhesive layer, an ink design layer, and a release layer. The release layer may be a wax release layer, and is often directly adjacent a carrier sheet, such as on a roll or web of labels. Thus, in such an example, the label may be thought to include a "support portion" (e.g., carrier sheet and release layer and a "transfer portion" (i.e., ink design layer and adhesive layer). When subjected to heat, the wax release layer softens, thereby allowing the transfer portion to be separated from the carrier sheet, and the adhesive layer adheres the ink design layer to an article being labeled. Alternatively, all or part of the wax release layer may transfer as well, to provide protection to the ink design layer. Additionally or alternatively, the labels may include a separate protective layer overlying the ink design layer to protect the ink design layer from abrasion.

More specifically, in the heat transfer labeling process, the label-carrying sheet is subjected to heat, and the label is pressed onto an article with the ink design layer making direct contact with the article. As the paper sheet is subjected to heat, the wax layer begins to soften so that the paper sheet can be released from the ink design layer. (And, as described above, a portion of the wax layer may be transferred with the ink design layer and a portion of the wax layer may remain with the paper sheet.) After transfer of the ink design layer to the article, the paper sheet is removed, leaving the ink design layer firmly affixed to the article. In an alternate embodiment, where the wax layer also transfers, the wax layer thus may serve two purposes: (1) to provide release of the ink design layer from the sheet upon application of heat to the sheet, and (2) to form a protective layer over the transferred ink design layer. After transfer of the label to the article, the transferred wax release layer may be subjected to a postflaming technique which enhances the gloss of the layer. Further, the presence of montan wax in the formulation also provides optical clarity to the layer (thereby enabling the ink design layer therebeneath to be better observed).

Thus, in general, many previous heat transfer labels for imprinting designs onto an article typically involve decorative laminates including a base sheet or web coated with a wax release layer over which a design is imprinted in ink. As is known to those of ordinary skill in the art, "wax" generally refers to a class of chemical compounds that are malleable near ambient temperatures. Characteristically, they melt above 45° C. to provide a low viscosity liquid. Waxes are organic compounds that are insoluble in water but soluble in petroleum-based solvents, and characteristically include long alkyl chains. Waxes may be natural or synthetic.

One disadvantage associated with the use of labels such as those described above is that the wax or waxes used in the release layers typically include a montan wax. Montan wax is a hard wax obtained by solvent extraction of certain types of lignite or brown coal. Its color ranges from dark brown to light yellow when crude, or white when refined. Its composition is non-glyceride long-chain ($C_{24}$-$C_{30}$) carboxylic acid esters (62-68 weight %), free long-chain organic acids (22-26%), long-chain alcohols, ketones, and hydrocarbons (7-15%), and resins having a melting range of about 82-95° C. One example of a montan wax that is used in wax release formulations is a partially saponified montan ester wax having an acid value in the range of 7-25 mgKOH/g, a dropping point in the range of 93° C.-110° C., a viscosity (at 120° C.) of 200-400, and a specific gravity in the range of 1.00 $g/cm^3$-1.03 $g/cm^3$. This montan wax may also have a penetrometer value of about 1. Such a wax is commercially available from Struktol Company of America (Stow, Ohio) under the name Struktol® Montan Wax OP. Another example of a release layer that includes montan wax-like release chemistry is disclosed in U.S. Pat. No. 4,557,964 (to Magnotta), the disclosure of which is hereby incorporated by reference herein in its entirety.

In general, when used with heat transfer labels (or other labels), montan wax imparts high gloss, hardness, and clarity into the release formulation and to the label. And these characteristics are very desirable in labels. Entities that produce labels (label manufacturers), and entities that use labels (the customers of those manufacturers), desire labels that have a clean, clear, and high gloss finish. Montan wax performs very well in these areas, and generally performs better than other types of wax used to date in the labeling industry.

Montan wax also does not suffer from the problem of "blushing," which is a concern with other waxes. Blushing is the tendency of a wax to turn opaque following a post-flaming process. Once post-flamed, release layers that do not include montan waxes (e.g., release layers including paraffin and/or microcrystalline waxes) can become "cloudy" and opaque (at least in some areas), thereby ruining the aesthetic appearance of the label (as the portion of the release layer now overlies the transferred transfer portion of the label on an article). In particular, the label may appear "splotchy," with some areas of the label appearing to have a matte finish, and other areas being shiny. When a release layer including montan wax is used (whether as a sole wax component, or in combination with other waxes), the "blushing" problem is reduced and eliminated.

And so, due to its performance characteristics, montan wax has been used in wax formulations for labels. It is generally a universal component used in release layers across the spectrum of labels.

However, there are drawbacks to the use of montan wax in release formulations. First, montan wax often undergoes degradation during the process of coating the wax release layer onto the carrier sheet, which causes the wax to yellow.

More specifically, during the coating process, the montan wax needs to be heated so that it softens and becomes somewhat flowable so that it can be coated onto the carrier sheet (e.g., paper or a polymer film). However, the temperatures that are used during this coating process are high enough that the montan wax may begin to degrade. For example, the wax is generally heated to near 300° F. prior to application to the carrier sheet. However, at temperatures near or exceeding 300° F., the degradation and yellowing of montan wax begins. This detracts from the aesthetic appearance of the label in that the label can appear yellowed. This problem is magnified when the label is applied to a light background, such as a white container. Unfortunately, there are presently no substitute waxes that can provide all the benefits of montan wax at a comparable or cheaper price as montan wax. Thus, label manufacturers attempt to closely manage the coating temperatures in an attempt to prevent the yellowing of montan wax.

Further, as described above, montan wax is only available from a very few locations worldwide (including Amsdorf, Germany, and in the Ione Basin near Ione, Calif.). Presently, there is an ongoing shortage of montan wax that is affecting the world wide supply of the wax. Thus, the price of montan wax is subject to increases, which, in turn, increases the cost of labels including montan wax.

Thus, as described above, there are certain drawbacks to the use of release layers that include montan wax. Additionally, there are currently used release layers that do not include montan wax as a component of the release formulation. An example of such a formulation is disclosed in U.S. Pat. No. 4,536,434 (to Magnotta), the disclosure of which is hereby incorporated by reference herein in its entirety. However, these current non-montan wax release layers also suffer drawbacks. For example, as described above, the presence of montan wax in the release formulation provides a high gloss surface to the release layer once transferred with the transfer layer of the label to an article. This high gloss surface is aesthetically pleasing and is desired by many label customers. Unfortunately, the currently used release layers that do not include montan wax do not provide a high gloss finish. Rather they provide a matte (no-gloss) finish, and so are not a desirable or an effective substitute for release layers including montan wax.

SUMMARY OF THE INVENTION

Certain exemplary aspects of the invention are set forth below. It should be understood that these aspects are presented merely to provide the reader with a brief summary of certain forms the invention might take and that these aspects are not intended to limit the scope of the invention. Indeed, the invention may encompass a variety of aspects that may not be explicitly set forth below.

One aspect of the present invention provides a label, such as a heat transfer label, that reduces or eliminates the use of montan wax in the release layer, thereby avoiding the drawbacks of montan wax (e.g., discoloration, meticulous attention to temperature, increased cost) while providing release, high gloss, hardness, and clarity. Thus, in one embodiment, the heat transfer label includes (a) a support portion; and (b) a transfer portion over the support portion for transfer of the transfer portion from the support portion to an article upon application of heat to the support portion while the transfer portion is placed into contact with the article, the support portion including a release layer including at least a synthetic wax. The transfer portion may include (i) a protective layer (which may be a protective lacquer), and (ii) an ink design layer proximal to the protective layer. The protective layer may be interposed between the release layer and the ink layer.

More specifically, the release layer of the label in one aspect of the present invention reduces or eliminates the use of montan wax, and uses a synthetic wax as a replacement for part of all of the montan wax. In certain embodiments, the release layer includes the synthetic wax and no montan wax. In other embodiments, the release layer includes a mixture of montan wax and synthetic wax (i.e., montan wax is eliminated). In embodiments including a mixture of montan and synthetic waxes, the amount of montan wax is reduced as compared to typical release layers.

In one embodiment, the synthetic wax may be derived from the esterification of a plant wax. The synthetic wax enjoys a high gloss level. Further, the synthetic wax exhibits color stability when heated well above 300° F., and even above temperatures of 340° F. Thus, use of the synthetic wax provides a release layer that is not subject to the drawbacks of yellowing and price increases, as described above with respect to montan wax. Further, as the wax is synthetic, it enjoys unlimited availability, and so is not subject to the worldwide shortages and resulting cost increases that montan wax is subject to.

In use, heat and pressure are applied to the label in contact with an article such as a plastic container, the release layer softens allowing the laminate which contains the decorative ink design to transfer onto the article to be decorated. The release layer, or a portion thereof, remains with the transfer portion, forming an optically clear, glossy, protective coating over the transferred ink design layer after the release coating resolidifies. The transferred laminate may be subjected to postflaming to improve the smoothness and gloss of the transferred release coating which forms the protective coating.

As described above, an important aspect of the invention is the improved formulation of the release layer. The improved release formulation has the advantage that it produces an optically clear, transparent, protective layer over the transferred ink design layer. Consequently, the release layer has distinct advantage in the application of heat transferable laminates to plastic containers, and in particular to clear plastic containers. The transferred release layer is optically clear to the unaided eye when viewed against a clear plastic container. There is no hazing, spotting, discoloration, or halo effect discernible over the transferred ink design layer regardless of whether the heat transferable laminate is applied to opaque or clear articles.

BRIEF DESCRIPTION OF THE DRAWINGS

The accompanying drawings, which are incorporated in and constitute a part of this specification, illustrate embodiments of the invention and, together with the general description of the invention given above and the detailed description of the embodiments given below, serve to explain the principles of the present invention.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Figure 1:
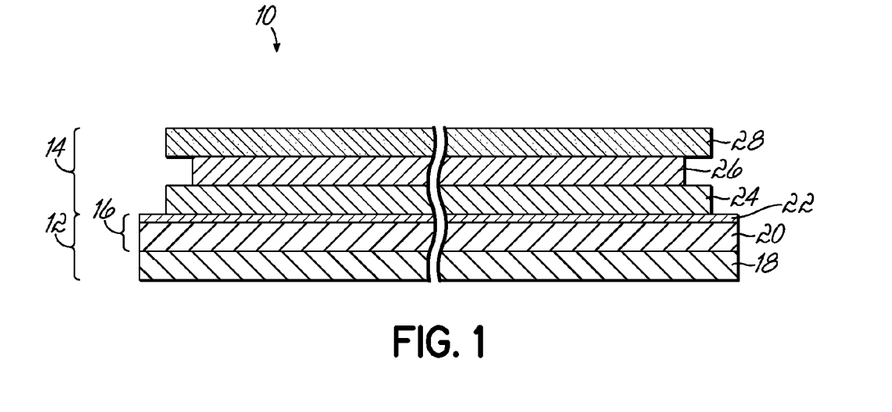
FIG. 1 is a schematic section view of a heat transfer label in accordance with the principles of the present invention.

Referring now to FIG. 1, there is shown a schematic section view of an embodiment of a heat transfer label 10. The label 10 includes a support portion 12 and a transfer portion 14. The support portion 12 may include a carrier sheet 18, which is typically paper or a similarly suitable substrate, and a release portion 16, which is overcoated onto the carrier sheet 18. The release portion 16 may include (1) a nonwax component 20, and (2) a release layer 22. The nonwax component 20 may include a layer of polyethylene or a layer of polypropylene. Details of such a polyethylene layer are disclosed in U.S. Pat. No. 4,935,300, and in U.S. Pat. No. 4,927,709, both of which are incorporated herein by reference in their entireties. The release layer 22 may include a synthetic wax and may be coated directly on top of the polyethylene or polypropylene layer. The release layer 22 may also include natural non-montan wax(es) (e.g., paraffin and/or microcrystalline waxes). Further the release layer 22 may include other ingredients, such as a binder and a tackifying resin. In one embodiment, the binder may include ethyl vinyl acetate, and the tackifying resin may be a tackifying hydrocarbon resin. During label transfer, a small portion of the release layer 22 may be transferred along with the transfer portion 14 of the label 10 onto the article being labeled. However, the amount of the release coat 22 transferred onto the article being labeled generally may not be readily discernible. Alternatively, all (or substantially all) of the release layer 22 may be transferred along with the transfer portion 14 of the label 10.

The transfer portion 14 may include a protective layer 24 printed directly on top of at least a portion of the release layer 22, an ink design layer 26 printed onto a desired area of protective layer 24, and an adhesive layer 28 printed over the ink design layer 26. The adhesive layer 28 may be printed onto a surrounding portion of the protective layer 24. The protective layer 24 is optional. The ink design layer 26 and adhesive layer 28 may be distinct layers (as shown in FIG. 1). Alternatively, an adhesive may be incorporated into ink or inks of the ink design layer 26.

One example of such a heat transfer label 10, as described above with respect to FIG. 1, is based on the construction of the CLEAR ADVANTAGE® label, commercially available from Multi-Color Corporation of Cincinnati, Ohio, the assignee of the present application. The CLEAR ADVANTAGE® heat transfer label includes a carrier sheet 18 of one-sided clay-coated paper (at 28 pounds per ream). The clay-coated side of the carrier sheet 18 is adjacent to a nonwax component 20 of high-density polyethylene that is extruded onto the paper (at 8 pounds per ream). A release layer 22 is layered on top of the high-density polyethylene (at 0.25 to 1.0 pound per ream). The high-density polyethylene nonwax component 20 and release layer 22 together form the release portion 16 of the support portion 12. The release portion 16 and the carrier sheet 18 together form the support portion 12. The transfer portion 14 is formed from a protective layer 24, an ink layer 26, and an adhesive layer 28. The protective layer in the CLEAR ADVANTAGE® heat transfer label includes materials having release characteristics. The ink layer in the CLEAR ADVANTAGE® label may be chosen from (1) polyester binder with a pigment, (2) vinyl binder with a pigment, or (3) acrylic binder with a pigment (although any suitable ink, inks, and/or ink layer may be used in the label of the present invention). Examples of materials for the protective layer 24 and ink layer 26 will be described in greater detail below. The adhesive layer 28 of the transfer portion 14 may be heat-activatable. In one embodiment, the adhesive layer 28 may include a vinyl acetate resin (such as an ethylene vinyl acetate resin), a tackifying petroleum hydrocarbon resin, and a microcrystalline wax (although any suitable adhesive may be used in the label of the present invention). The adhesive layer 28 will be described in greater detail below. The CLEAR ADVANTAGE® label is merely one example of a type of label that may be used to incorporate various aspects of the present invention, such as the use of a synthetic wax (as will be described in greater detail below). However, the present invention is not limited to labels having the same construct as CLEAR ADVANTAGE® labels.

Figure 2:
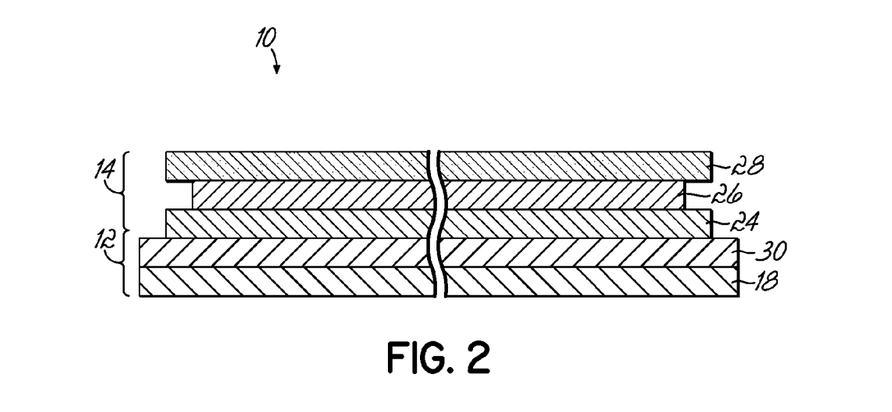
FIG. 2 is a schematic section view of another heat transfer label in accordance with the principles of the present invention.

Referring now to FIG. 2, there is shown a schematic section view of a second embodiment of a heat transfer label 10. This label 10 also includes a support portion 12 and a transfer portion 14. The support portion 12 may include a carrier sheet 18, which is typically paper or a similarly suitable substrate, and a release layer 30, which is overcoated onto the carrier sheet. The release layer 30 may include a synthetic wax. The release layer 30 may also include natural, non-montan wax(es) (e.g., paraffin and/or microcrystalline waxes). Further, the release layer 30 may include other ingredients, such as a binder and a tackifying resin. In one embodiment, the binder may include ethylene vinyl acetate resin and the tackifying resin may be a tackifying hydrocarbon resin. During label transfer, a small portion of the release layer 30 may be transferred along with the transfer portion 14 of the label 10 onto the article being labeled. Alternatively, all (or substantially all) of the release layer 30 may be transferred along with the transfer portion 14 of the label 10.

As described above, the transfer portion 14 may include a protective layer 24 printed directly on top of at least a portion of the release layer 30, an ink design layer 26 printed onto a desired area of the protective layer 24, and an adhesive layer 28 printed over the ink design layer 26. The adhesive layer 28 may be further printed onto a surrounding portion of the protective layer 24. The protective layer 24 is optional. The ink design layer 26 and adhesive layer 28 may be distinct layers. Alternatively, an adhesive may be incorporated into ink or inks of the ink design layer 26.

One example of such a heat transfer label 10, as described above with respect to FIG. 2, is based on the construction of the THERIMAGE® label, commercially available from Multi-Color Corporation of Cincinnati, Ohio, the assignee of the present application. The THERIMAGE® heat transfer label includes a carrier sheet 18 of one side clay-coated paper (at 29.5 pounds per ream). The clay-coated side is adjacent to a release layer 30, and includes at least a synthetic wax. This synthetic wax may be combined in the release layer with natural non-montan wax(es). At least the synthetic wax is melted and flood-coated onto the one-sided clay-coated carrier sheet 18. The wax has a coat weight of 7 pounds per ream. The carrier sheet 18 and the release layer 30 form the "support portion" 12 of the label. The transfer portion 14 is formed of a protective layer 24, an ink layer 26, and an adhesive layer 28. More specifically, the protective layer can be a ViTEL® polyester. The ink layer 26 can be a polyamide binder with pigment or an acrylic binder with pigment (although any suitable ink, inks, and/or ink layer may be used in the label of the present invention). This ink layer 26 is gravure-applied to the protective layer 24. And finally, the adhesive layer 28 used in the THERIMAGE® label may be that which is described above with respect to the CLEAR ADVANTAGE® label, and which will be described in greater detail below (although any suitable adhesive may be used in the label of the present invention). The THERIMAGE® label is merely one example of a type of label that may be used to incorporate various aspects of the present invention, such as the use of a synthetic wax (as will be described in greater detail below). However, the present invention is not limited to labels having the same contrast as THERIMAGE® labels.

Thus, the labels 10 of FIGS. 1 and 2 are similar in their constructs, with each including a carrier sheet 18, release layer 22 (FIG. 1) or 30 (FIG. 2) including at least a synthetic wax, protective layer 24, ink layer 26, and adhesive layer 28. It will be recognized by those skilled in the art that the labels based on the CLEAR ADVANTAGE® and THERIMAGE® constructions described above are merely examples of heat transfer labels, and that any other heat transfer labels may be used in the present invention. Further, it will be recognized that the release layer of the present invention may be used with labels other than heat transfer labels. Those other labels (whether heat transfer label or not) may or may not include all of the various layers described above. Materials that may be used in each of the layers will now be described in greater detail.

The label 10 satisfies a number of requirements. Release layer 22 or 30 is easily coated onto non-wax component 20 or carrier web 18 when the release layer is in a softened, liquid, thixotropic, or molten state. This coating is readily effected preferably by gravure methods but other printing methods such as letterpress, flexographic, or screen printing as well as cast coating methods such as reverse roller coating may be employed in coating release layer 22 or 30 onto non-wax component 20 or carrier 18. The ink design layer 26 is readily coatable on release layer 22 or 30 by use preferably of gravure technique, although other cast coating methods and screen printing methods may also be used. Release layer 22 or 30 and ink design layer 26 have the required physical properties that permit coating by the preferred gravure technique without "pick off" problems occurring; that is, without causing removal of a portion of release layer 22 or 30 as the ink design layer 26 is coated thereon.

Release layer 22 or 30 is also of a formulation (including synthetic wax to replace or reduce montan wax) that can be subjected to high temperatures (e.g., in excess of 300° F.) without suffering discoloration. Release layer 22 or 30 is of a formulation which also prevents nonuniform splitting of the release layer during the heat transfer process and thereby prevents insufficient or uneven transfer of the release layer from the carrier web during the transfer process.

In addition to having the requisite release property upon heating, release layer 22 or 30 also has sufficient adhesive properties upon cooling which keeps design layer 26 adhesively bonded to the article being imprinted and also forms a clear, glossy protective coating layer over the transferred design layer 26. The clarity, smoothness, and glossiness of release layer 22 or 30 may be improved by subjecting transfer portion 14 to postflaming after portion 14 has been transferred to an article. The postflaming may be accomplished by exposing the transferred substrate to jets of hot gas either as direct gas flame or as hot air jets for a period of time sufficient to remelt the wax, as for example by the methods described in U.S. Pat. No. 3,616,015, herein incorporated by reference. After postflaming, release layer 22 or 30 resolidifies quickly upon exposure to ambient conditions to form a smooth, glossy film of improved clarity. The resolidified layer exhibits so high a degree of clarity and translucency that there is virtually no visible halo or hazing either around or over the surface of the transferred design image 26. This results in remarkable clarity in the transferred design image. Thus, the label 10 is suitably applied to plastic and glass articles of a variety of shades, as well as to articles and containers composed of optically clear plastic materials such as polyvinylchloride and polyethylene terephthalate or clear polyethylene or polypropylene.

The virtual elimination of discoloration, hazing, or halo has been accomplished while satisfying all other physical property requirements for an effective release coating for a heat transferable substrate. Additionally, this improvement has been made while reducing or eliminating the amount of montan wax in the preferred formulation. Since montan wax is a costly constituent, this can result in significant cost savings in the formulation for release layer 22 or 30.

The release layer 22 or 30 may include various materials. As described above, the release layer 22 or 30 includes a synthetic wax. An exemplary formulation for the release layer 22 or 30 may include synthetic wax, paraffin wax, and microcrystalline wax. In addition to these waxes, the formulation may include a tackifying resin and a binder. Through selection of tackifier resin, the total amount of crystallinity of any paraffin wax can be reduced. This can serve to reduce the amount of "haze" over the final transferred image (in addition to the prevention of discoloration due to use of synthetic wax for reduction or elimination of montan wax). Although postflaming serves to reduce some of the hazing which appears over the transferred image it effects only a partial reduction and does not decrease the crystallinity of the wax (natural or synthetic) components. Postflaming has been determined to increase clarity principally because it has the effect of smoothing microscopic hills and valleys on the surface of the transferred release layer. Postflaming thus creates a smoother, more uniform surface of glossy character, increases the overall clarity of the transferred release layer, and consequently the clarity of the transferred design image.

Thus, the waxes included in one embodiment of the release formulation include a synthetic wax, a paraffin wax, and a microcrystalline wax. This embodiment of the release formulation may further include a hydrocarbon tackifying resin and an ethylene-vinyl acetate copolymer. The release formulation, during coating onto a carrier sheet and in use, is typically heated between 300-330° F. The formulation of the present invention can be easily heated to these temperatures without exhibiting any discoloration. This is due to the use of synthetic wax in place of or to reduce the montan wax in or from the formulation, as it is montan wax that suffers discoloration at such high temperatures. Indeed, the formulation can be heated to temperatures up to and above 340° F. without discoloration or suffering the other drawbacks typical of release formulations that include montan wax.

In one embodiment, the synthetic wax may be derived from the esterification of a plant wax. As is known to those of ordinary skill in the art, waxes are biosynthesized by many plants or animals. They typically consist of several components, including wax esters, wax acids, wax alcohols, and hydrocarbons. Wax esters are typically derived from a variety of carboxylic acids and a variety of fatty alcohols. More specifically, esters are chemical compounds derived by reacting an oxoacid with a hydroxyl compound such as an alcohol or phenol. Esters are usually derived from an inorganic acid or organic acid in which at least one —OH (hydroxyl) group is replaced by an —O-alkyl (alkoxy) group, and most commonly from carboxylic acids and alcohols. That is, esters are formed by condensing an acid with an alcohol.

Wax esters are typically derived from a variety of carboxylic acids and a variety of fatty alcohols. During esterification, two reactants (typically an alcohol and an acid) form an ester as the reaction product. For esterification of carboxylic acids, the classic synthesis is the Fischer esterification, which involves treating a carboxylic acid with an alcohol in the presence of a dehydrating agent:

The equilibrium constant for such reactions is about 5 for typical esters, e.g., ethyl acetate, but the reaction is slow in the absence of a catalyst. Sulfuric acid is a typical catalyst for this reaction. Many other acids are also used such as polymeric sulfonic acids. Since esterification is highly reversible, the yield of the ester can be improved using le Chatelier's principle [i.e., using the alcohol in large excess (i.e., as a solvent); using a dehydrating agent; and removal of water by physical means].

In one embodiment, a suitable synthetic wax derived from the esterification of a plant wax may have an acid value between 45 and 55, a saponification number between 155 and 165, a dropping point between 75° C. and 85° C., an iodine color between 10 and 20, and a viscosity (120° C. mPa·s) between 10 and 15. More specifically, the synthetic wax may have an acid value of about 48.4, a saponification number of about 161, a dropping point of about 81.9° C., an iodine color of about 16.3, and a viscosity (120° C. mPa·s) of about 13.6. Such a synthetic wax is commercially available from Volpker Spezialprodukte GmbH of Volpke, Germany, under the label "Esterified Plant Wax." Further, this synthetic wax is soluble in organic solvents. Thus, it can be used in a formulation of a printable release layer, such as that described in U.S. Patent Application Publication No. 2008/0311331 A1 (to Laprade), the disclosure of which is incorporated by reference herein in its entirety.

However, it will be recognized by those of ordinary skill in the art that the above-described synthetic wax (i.e., available from Volpker Spezialprodukte GmbH of Volpke, Germany, under the label "Esterified Plant Wax," and having the specific listed characteristics) is merely one example of a synthetic wax that may be used to provide a release layer in accordance with the principles of the present invention. Other synthetic waxes having different or similar characteristics may be used, provided that those synthetic waxes are suitable to avoid the drawbacks of montan wax (e.g., discoloration, meticulous attention to temperature, increased cost, etc.) while providing release, high gloss, hardness, and clarity.

As described above, the synthetic wax may be used to replace montan wax (i.e., eliminating montan wax from the formulation of the release coating). Alternatively, the synthetic wax may be used to reduce the amount of montan wax in the formulation of the release coating. Thus, in one embodiment, the release formulation may include no montan wax. In another formulation, the ratio of synthetic wax to montan wax may be about 25%/75%. In another formulation, the ratio of synthetic wax to montan wax may be about 50%/50%. In another formulation, the ratio of synthetic wax to montan wax may be about 75%/25%.

Further, it will be recognized by those of ordinary skill in the art that in addition to the synthetic wax, described above, the present application also discusses that the release formulation may include a tackifying resin which maybe a tackifying hydrocarbon resin. It will be appreciated by those of ordinary skill in the art that the hydrocarbon resin is a separate component from the synthetic wax.

Embodiments of the formulation for release layer 22 or 30 may also contain paraffin wax and a minor amount of microcrystalline wax. In addition to these waxes, the formulation includes a tackifying resin and suitable binder. With proper selection of tackifier resin, the total amount of crystallinity of the paraffin wax can be reduced significantly, more than would occur by addition of other resins or diluents of equal amount. It is not known with certainty all of the factors responsible for the high degree of clarity and translucency of the transferred release layer 22 or 30, but the reduction in inherent crystalline structure of the paraffin wax and to an extent the microcrystalline wax, as well, is believed to be the principal factor. Although it is known that the inherent crystallinity of certain waxes, particularly paraffin wax, used in release coating for heat transferable laminates is a principal cause of the hazing effect, it has been heretofore not been possible to reduce the crystallinity of the solidified wax without disrupting other important physical properties of the release layer. Although postflaming serves to reduce some of the hazing which appears over the transferred image it effects only a partial reduction and does not decrease the crystallinity of the wax components. Postflaming has been determined to increase clarity principally because it has the effect of smoothing microscopic hills and valleys on the surface of the transferred release layer. Postflaming thus creates a smoother, more uniform surface of glossy character, increases the overall clarity of the transferred release layer, and consequently the clarity of the transferred design image.

It is desirable to select a thermoplastic tackifying resin which is composed of an optically clear, nonwax hydrocarbon polymer having a softening point (Ball & Ring Method ASTM E-28) between about 60° C. and 135° C., more preferably between about 85° C. and 125° C., and most preferably between about 100° C. and 125° C. Applicant has found a particular polymer class of thermoplastic resins which when added to the release formulation, increase the adhesiveness of the release layer and quite unexpectedly reduces the amount of crystalline structure in the solidified wax. This reduction is greater than might be expected from dilution of the wax with other resins or diluents added in the same proportion. The marked reduction in total crystallinity of the wax, it is theorized, enhances the optical clarity of the wax upon resolidification. The solidified release layer has a color Gardner No. between about 1 and 4. The tackifying resin also preferably has a color Gardner number between about 1 and 4, typically between about 1 and 3.

The polymer class for the tackifying resin having the above-described properties and determined to unexpectedly reduce the amount of crystalline structure in the solidified wax is a transparent nonwax hydrogenated hydrocarbon resin. More specifically, it is the product of a cyclic hydrocarbon monomer which has been polymerized and subsequently fully hydrogenated to completely saturate the polymer. Suitable cyclic hydrocarbon monomers which are polymerized and subsequently fully hydrogenated to form the tackifying resin component are preferably selected from $C_4$ to $C_8$ cyclic hydrocarbon monomers.

One example of a tackifying resin is formed of cyclopentadiene monomer which is polymerized and subsequently fully hydrogenated. A tackifying resin of this latter type employing cyclopentadiene monomer which is polymerized and subsequently fully hydrogenated is available under the ESCOREZ series resins from Exxon Chemical Company. A preferred tackifying resin of the ESCOREZ series is ESCOREZ 5300 resin. This resin has a water white color (Color Gardner No. of 3 or less); a Ball and Ring softening point of about 105° C.; a specific gravity (60°/60° F.) of 1.10; a Brookfield viscosity (70 percent in toluene at 60° F.) of about 130 centipoise; and a flash point (COC) of about 210° C.

An alternative ESCOREZ resin having a somewhat higher softening point is ESCOREZ 5320 resin. The latter resin has a water white color (Color Gardner No. of 3 or less); a Ball and Ring softening point of about 125° C.; a specific gravity (60°/60° F.) of 1.10; a Brookfield viscosity (70 percent in toluene at 60° F.) of about 350 centipoise; and a flash point (COC) of about 243° C. An alternative tackifying resin is a transparent nonwax hydrogenated hydrocarbon resin formed of styrene monomer which is polymerized and subsequently fully hydrogenated. A resin of this latter type is available under the REGALREZ trade name from Hercules Chemical Company. A specific REGALREZ resin found to be particularly suitable for use as the tackifying resin in the present invention is REGALREZ 1126, which has a crystal clear color; a Ball and Ring softening point of between about 122° C. to 130° C.; a specific gravity at 21° C. of 0.97; an acid number of less than 1.0; and a melt viscosity of 1 poise at 209° C. and 10 poise at 182° C.; and a flashpoint (COC) of 243° C.

The use of a tackifying resin from the above-described classes in the release layer 22 or 30 has an additional advantage over conventional resins such as pentarerythritol ester of hydrogenated rosin used in prior art wax release formulations. Such resins may oxidize over a period of time causing a dulling effect in the appearance of the transferred design image. In contrast, the tackifying resins employed in the present formulations for release layer 22 or 30 do not oxidize with time after the transfer portion 14 has been transferred onto an article.

The paraffin wax component of the formulation for release layer 22 or 30 is used to give release layer 22 or 30 its principal release characteristic upon melting. Paraffin wax, a petroleum derived product, typically has a molecular weight between about 254 to 450 and is composed essentially of linear saturated hydrocarbons ranging from $C_{18}H_{38}$ to $C_{32}H_{66}$. Paraffins typically have a melting point from about 110° to 150° F. ("Melting point" as used herein refers to drop melting point). A preferred paraffin wax for use in the formulation of the present invention is composed of linear saturated hydrocarbons ranging from $C_{26}H_{54}$ to $C_{32}H_{66}$ having a melting point between about 145° F. to about 155° F.

The paraffin wax, a linear saturated hydrocarbon, is characterized in that it crystallizes in both plate and needle-type crystals, particularly the former. Another type of crystalline structure, termed malcrystalline, is neither plate nor needle-like and is observable in the paraffin crystal structure in amount depending on the boiling point of the paraffin fraction being investigated. In paraffin wax fractions of lower boiling point, for example about 180° F. at 10 mm pressure, the entire crystalline structure is composed of plates. In paraffin wax fractions having somewhat higher boiling points, a minor amount of malcrystalline and needle-like structures may be observable interspersed among the plate-like structures. In general, the plate crystals predominate in paraffin waxes of any boiling range. However, in the higher melting paraffin waxes where there is likely to be some increased amount of branching associated with their structure, there is likely to be a greater portion of malcrystalline and needle-like crystals interspersed among the plates. The type and amount of crystals found in paraffin wax is principally an inherent function of the boiling point range of paraffins being investigated irrespective of the solvent or medium used from which the crystalline solid is precipitated.

Paraffin wax suitable for use in release layer 22 or 30 is sold in various grades which differ chiefly in melting point. Commercial grades of paraffin wax which may be used in release layer 22 or 30 are commonly designated as refined, semirefined, and crude grade waxes. Of these the refined grade is preferred for use in the present formulation for release layer 22 or 30. Paraffin wax of refined grade is obtainable from a number of sources, one of which is the Petrolite Corp., Bareco Division, of Tulsa, Okla.

The microcrystalline component of release layer 22 or 30 is composed of saturated hydrocarbons of higher melting point than those of paraffin wax. Microcrystalline waxes characteristically contain between about $C_{34}H_{70}$ to $C_{60}H_{120}$ hydrocarbons having molecular weight between about 478 and 840. Microcrystalline waxes (micro-waxes) are characterized by an increased amount of branching; although they contain straight chain molecules, they are not as linear a saturated hydrocarbon as paraffin wax. Also compared to paraffin wax, they contain a greater portion of cyclic ring molecules. The crystalline structure of the microcrystalline wax contains predominantly malcrystalline and needle-like crystals having very small undefined form when compared with the plate-like crystalline structure of paraffin wax under the same magnification. Thus the crystalline structure of microcrystalline wax is small and irregular when solidified from the melted wax. In solvents microcrystalline wax discloses no well-formed crystals of any size. Small amounts of microwax are advantageously added to the formulation for release layer 22 or 30, since microwax imparts a measure of plasticity to the paraffin wax components, since the paraffin wax is rather brittle and would by itself tend to cause cracks or fissures in a wax release layer. Because of its diminished crystalline structure, microwax contributes little potential hazing or halo effect.

The classes of microwaxes vary principally in their melting point range. For example, the so-called hard microwaxes have a melting point between about 190° to 210° F.; the plastic microwaxes a melting point between about 145° to 175° F.; the emulsifiable crystalline waxes between about 190° to 225° F.; and modified microwaxes between about 165° to 220° F. All of these various types of microwaxes may be employed in the present formulation; however, the plastic type (BARECO designation) is most preferred. An illustrative, commercially available microcrystalline wax which is particularly suitable in the present formulation is available under the Victory White trade name from the Petrolite Corp.

A particularly suitable binder in the preferred release formulation is a copolymer of ethylene and vinyl acetate, such as that available under the trade name Elvax 410 from E.I. DuPont Company, Wilmington, Del. The binder is used principally to bind the components of the release formulation (release layer 22 or 30) in a homogeneous mixture, which forms a hot melt and does not require a solvent. The various components of the release formulation do not copolymerize in any measure during the coating stage or during melting and subsequent resolidification of release layer 22 or 30. A binder of copolymer of ethylene and vinyl acetate such as Elvax 410 is most preferred because it provides high optimum gloss in blends with wax. However, other binders of ethylene and vinyl acetate copolymer, as for example, Elvax 210, 310, may be used. An alternative binder in the ELVAX series such as Elvax 4310 which is ethylene vinyl acetate acrylic acid terpolymer has also been determined to be suitable. Also in place of the above-referenced binders acrylic acid terpolymer has also been determined to be an ethylene acrylic acid copolymer binder may be employed. A suitable binder of this latter type is available under the trade name AC-540 from Allied Chemical Company.

Apart from the components including release layer having a synthetic wax described above, the label 10, and particularly the transfer portion 14 thereof, may include further layers. Examples of these further layers are a protective layer 24, an ink design layer 26, and an adhesive layer 28. The protective layer 24 may include a release agent and at least one of a hard polyester resin or an acrylic resin. An example of a hard polyester resin is ViTEL® 2300 (Shell Chemical Company, Akron, Ohio), a copolyester resin having a high tensile strength of 8000 psi, a low elongation of 7%, a 79 D scale Shore Durometer hardness, and a 156° C. ring and ball melt flow point. An example of a lacquer composition for use in forming protective lacquer layer 24 is the following: ViTEL® 2300 (21.4% by weight); nitrocellulose (4.5% by weight); AEROSOL® OT-MSO dioctyl sodium sulfosuccinate in mineral seal oil (4.5% by weight); castor oil (0.9% by weight); toluene (27.4% by weight); methyl ethyl ketone (MEK) (20.4% by weight); and ethyl acetate (20.4% by weight).

Other suitable examples of lacquer compositions for use in forming the protective layer 24 include the following example: ViTEL® 2300 (23.5% by weight); castor oil (1.07% by weight); toluene (30.1% by weight); methyl ethyl ketone (MEK) (22.5% by weight); and ethyl acetate (22.5% by weight). Then, carnauba wax or UNITHOX 750 polyethylene wax is added to the aforementioned mixture in an amount constituting 7%, by weight, of the total composition.

And, the following is another suitable example of a protective layer 24: BOSTIK 7922 polyester resin (20% by weight), (a semicrystalline, linear saturated polyester available from Emhart Corporation of Farmington, Conn., having a hardness of 65 Shore A, a specific gravity of 1.23, softening range (R&B) of 275° F.-297° F., a solution viscosity (30% solids in 50/50 MEK/Toluol) of 60-200 cps and a solution viscosity (30% solids in ethyl acetate) of approximately 300-400 cps); VAGH vinyl resin (5% by weight), (a vinyl resin solution available from Union Carbide Chemicals, Danbury, Conn., having a polymer composition by percentage weight of 90 VCl, 4 VAc and 6 vinyl alcohol, an average molecular weight of 27,000, a glass transition temperature of 79° C., a specific gravity ASTM D792 of 1.39 and a solution viscosity at 25° C. of 1000 cP); nitrocellulose (1.7% by weight); castor oil (0.8% by weight); UNITHOX 750 ethoxylated alcohol (7% by weight); MEK (26.2% by weight); toluene (19.6% by weight); and ethyl acetate (19.6% by weight).

Still yet another alternative example comprises the lacquer composition used to make the label of U.S. Pat. No. 5,766,731 (the disclosure of which is incorporated herein by reference), to which carnauba wax or UNITHOX 750 ethoxylated alcohol has been added.

In one exemplary method of forming the protective layer 24 using any of the aforementioned lacquer compositions, a lacquer composition is deposited onto a desired area of the release layer 22 (in the embodiment of FIG. 1) or release layer 30 (in the embodiment of FIG. 2), preferably by gravure printing or a similar technique. After deposition of the lacquer composition onto the desired area of the release layer 22 or 30, the deposited layer is heated, causing the volatile components thereof to evaporate and leaving only the nonvolatile components thereof to make up the protective lacquer layer 24.

The ink design layer 26 of the transfer portion 14 may include a conventional polyamide ink (such as in a THERIMAGE® label), which may take the form described in one or more of the above-referenced patents. The ink design layer 26 is formed in the conventional manner by depositing, by gravure printing or the like, an ink composition comprising a polyamide resin, a suitable pigment or dye, and one or more suitable volatile solvents onto one or more desired areas of the protective lacquer layer 24. After application of the ink composition onto the protective lacquer layer 24, the deposited layer is heated, causing the volatile solvent component(s) of the ink solvent system to evaporate and leaving only the nonvolatile components thereof to form the ink design layer 26. As described above, alternative ink design layers may include an acrylic binder. And in the case of at least a label based on the CLEAR ADVANTAGE® label, the ink may include a polyester binder or a vinyl binder.

The adhesive layer 28 of the transfer portion 14 may include a vinyl acetate resin, a tackifying petroleum hydrocarbon, and a microcrystalline wax. One example of a vinyl acetate resin is an ethylene vinyl acetate resin. An example of the ethylene vinyl acetate resin is ELVAX® 40-W, a 39-42% vinyl acetate, medium to low viscosity (0.70 cP at 30° C. and 0.25 g 1100 ml toluene) resin commercially available from ICI Acrylics, Inc. (Wilmington, Del.), which is soluble in organic solvents and has a bulk density of 30 lb/ft$^3$ (ASTM-D 1895/B), a ring and ball softening point of 200° C. and a melt index of 48-66 grams per 10 minutes (ASTM-D 1238 modified).

The adhesive layer 28 of the transfer portion 14 also includes a hydrocarbon resin, such as a tackifying petroleum hydrocarbon. An example of the tackifying petroleum hydrocarbon as used in the present invention is Escorez 1315 from ExxonMobil Chemical. The hydrocarbon resin promotes adhesion of the label to the nonoxidized article surface.

The adhesive layer 28 of the transfer portion 14 also includes a microcrystalline wax. The microcrystalline component of release layer 22 or 30 may be composed of saturated hydrocarbons of higher melting point than those of paraffin wax. Microcrystalline waxes characteristically contain between about $C_{34}H_{70}$ to $C_{60}H_{120}$ hydrocarbons having molecular weight between about 478 and 840. Microcrystalline waxes (microwaxes) are characterized by an increased amount of branching; although they contain straight chain molecules, they are not as linear a saturated hydrocarbon as paraffin wax. Also compared to paraffin wax, they contain a greater portion of cyclic ring molecules. The crystalline structure of the microcrystalline wax contains predominantly malcrystalline and needle-like crystals having very small, undefined form when compared with the plate-like crystalline structure of paraffin wax under the same magnification. Thus, the crystalline structure of microcrystalline wax is small and irregular when solidified from the melted wax. In solvents, microcrystalline wax discloses no well-formed crystals of any size. Small amounts of microwax may be added to the formulation for release layer 22 or 30, since microwax imparts a measure of plasticity to the paraffin wax components, since the paraffin wax is rather brittle and would, by itself, tend to cause cracks or fissures in a release layer 22 or 30. Because of its diminished crystalline structure, microwax contributes little potential hazing or halo effect.

The classes of microwaxes vary principally in their melting point range. For example, the so-called hard microwaxes have a melting point between about 190° F.-210° F.; the plastic microwaxes a melting point between about 145° F.-175° F.; the emulsifiable crystalline waxes between about 190° F.-225° F.; and modified microwaxes between about 165° F.-220° F. All of these various types of microwaxes may be employed in the present formulation. An illustrative, commercially available microcrystalline wax that is particularly suitable in the present formulation is available under the Victory White trade name from the Petrolite Corporation.

The microcrystalline wax also promotes adhesion of the label 10 to a nonoxidized article surface. More specifically, the microcrystalline wax allows the formulation of the adhesive to tackify more aggressively at a given transfer temperature. This temperature is generally about 260° F. in one embodiment of the present invention. The presence of the microcrystalline wax in the formulation imparts a sharper melting point to the formulation, thereby making the adhesive more aggressive at a given temperature.

Further, it is believed that the microcrystalline wax helps prevent or minimize the potential for label blocking when the labels 10 are in roll form. As is well known to those skilled in the art, when labels are packaged in a roll, the labels contact one another, such that the adhesive on one label may come into contact with a surface of an adjacent label. Should the roll of labels be inadvertently subjected to temperatures at which the adhesive will begin to tackify, the labels may adhere, i.e., become "blocked," to one another. The presence of the microcrystalline wax in the adhesive formulation softens and begins to flow at increased temperatures, and prevents bonding sufficient to block the labels.

One example of an adhesive composition that may be used to form the adhesive layer 28 has the following composition: 70% ELVAX® 40-W, 25% Escorez 1315, and 5% Victory White Wax dissolved to 25% solids in toluene.

The adhesive layer 28 may be formed by depositing onto the ink design layer 26, by gravure printing or the like, the aforementioned adhesive composition. The deposited composition is then heated, causing the volatile components of the composition to evaporate and leaving only the nonvolatile solid components thereof to form the adhesive layer 28.

The principles of the present invention will be further appreciated in view of the nonlimiting Examples below.

EXAMPLES

Example 1

Comparison of Performance Characteristics

Figure 3:
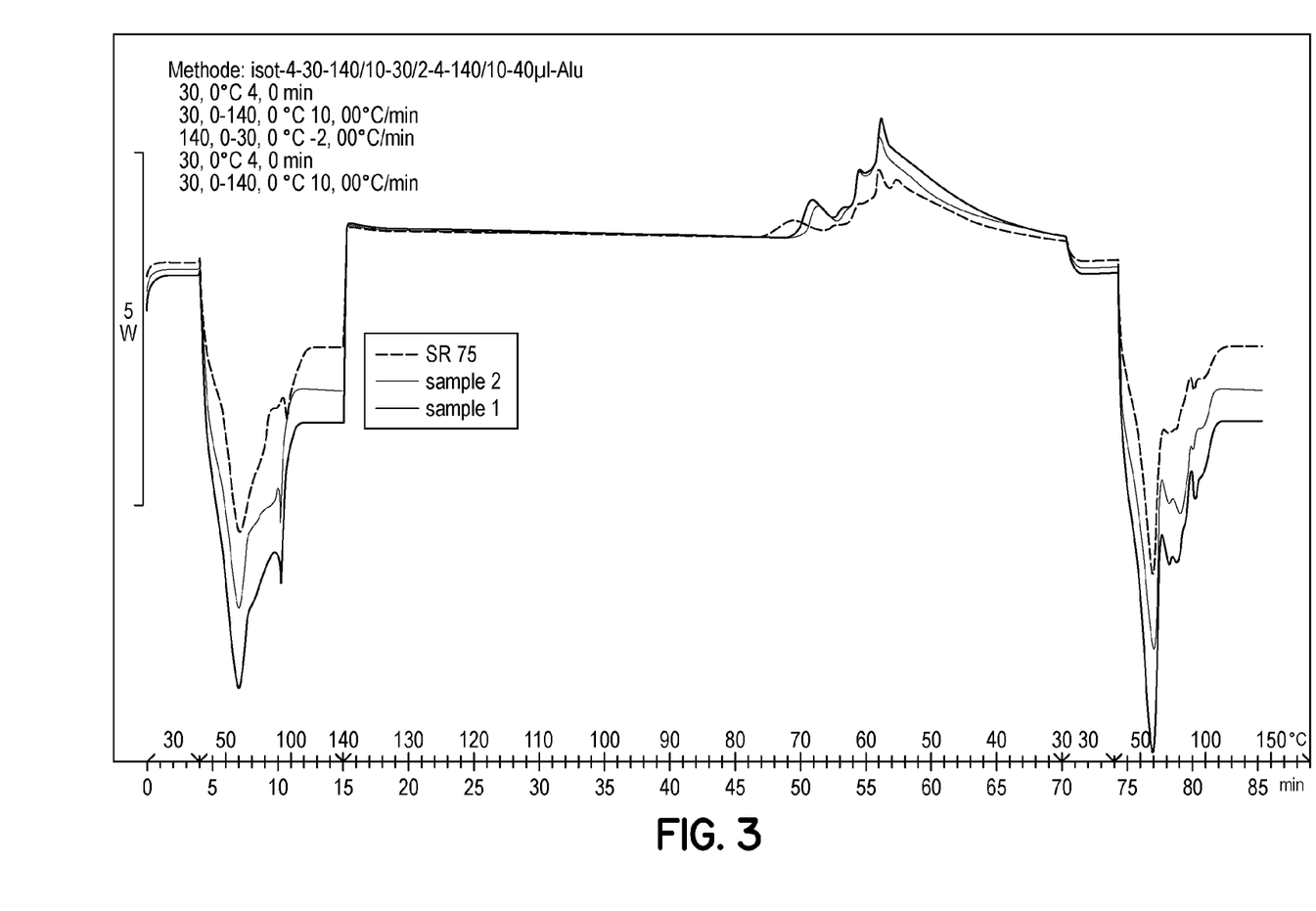
FIG. 3 is a graph showing a comparison of thermal curves of three wax formulations subjected to differential scanning calorimetry.
Figure 4:
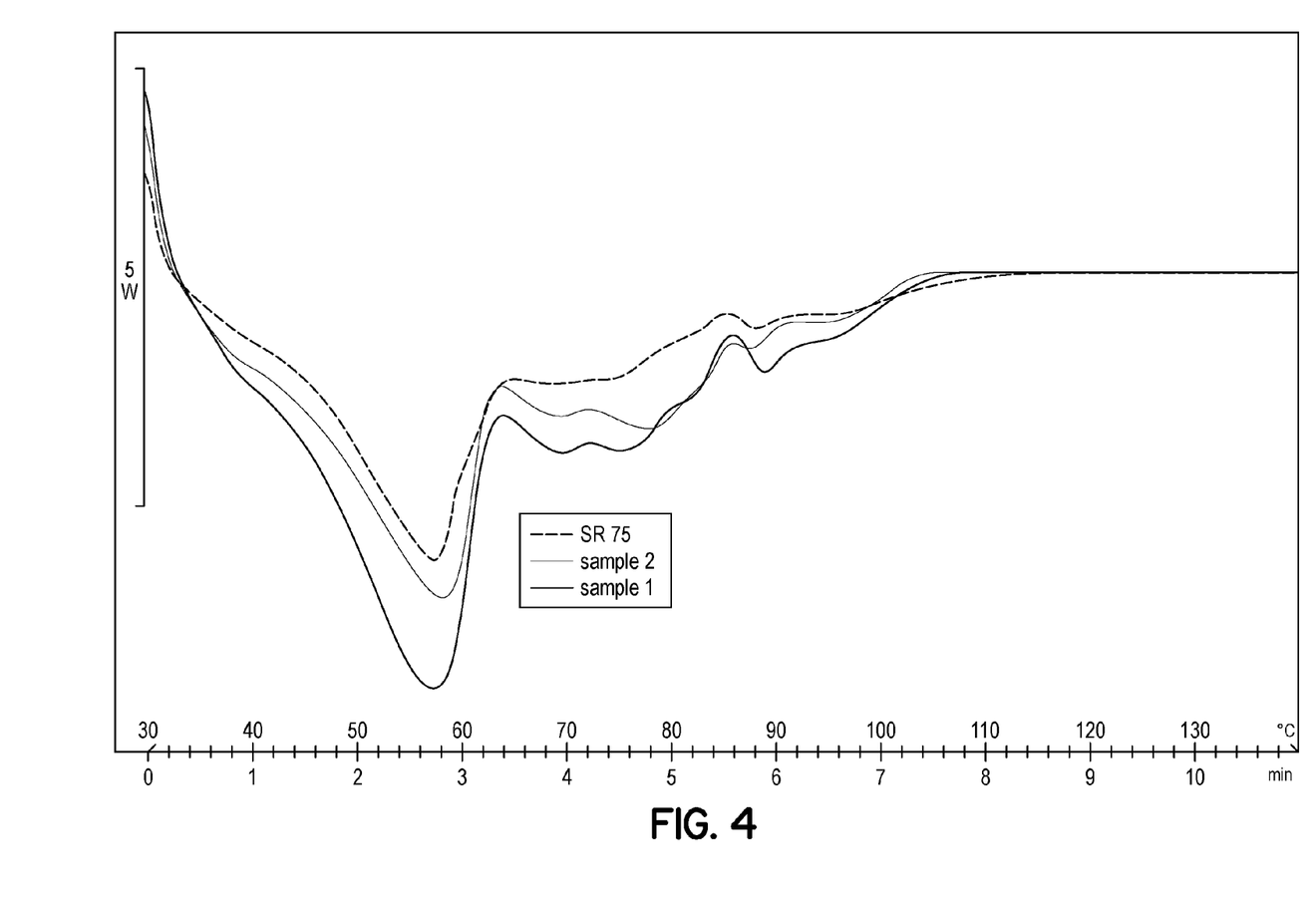
FIG. 4 is another graph showing a comparison of thermal curves of three wax formulations subjected to differential scanning calorimetry.

FIGS. 3 and 4 are graphs showing a comparison of certain performance characteristics of a typical wax release formulation including montan wax ("SR75"), as compared to certain performance characteristics of release formulations that either reduce the fraction of montan wax in the formulation ("Sample 1") or eliminate the fraction of montan wax in the formulation ("Sample 2").

More specifically, FIGS. 3 and 4 show thermal curves of the three formulations subjected to differential scanning calorimetry. As is known to those of ordinary skill in the art, differential scanning calorimetry is a thermo-analytical technique in which the difference in the amount of heat required to increase the temperature of a sample and a reference is measured as a function of temperature (and particularly measures the points of phase transitions of the sample as compared to a reference). In the graphs of FIGS. 3 and 4, the comparison occurs between three formulations. The first formulation (designated SR75) is a typical currently used formulation wherein the wax component includes montan wax and does not include synthetic wax (e.g., an esterified plant wax). This may be referred to herein as a "100% montan wax" sample. This does not mean that there are not other waxes present in the SR75 release formulation. Rather, as used in these Examples, "100% montan wax" means that the component of the release formulation that would include montan wax or synthetic wax or a combination of montan and synthetic wax, is solely montan wax. A typical wax release formulation including the montan wax designated by SR75 includes montan wax in the range of 20-60 weight percent, paraffin wax in the range of 10-13 weight percent, microcrystalline wax in the range of 2-12 weight percent, a tackifying hydrocarbon resin in the range of 10-30 weight percent and an ethylene vinyl acetate binder in the range of 2-10 weight percent. More specifically, a particular wax release formulation, such as that designated by SR75 in FIGS. 3 and 4, includes montan wax at 45 weight percent, paraffin wax at 22 weight percent, microcrystalline wax 6 weight percent, tackifying hydrocarbon resin at 22 weight percent and ethylene vinyl acetate at 5 weight percent. The montan wax may be MONTAN commercially available from Struktol Company of America (Stow, Ohio). The tackifying hydrocarbon resin may be ESCOREZ™ commercially available from Exxon Chemical Company. The ethylene vinyl acetate may be ELVAX® commercially available from the E. I. DuPont Company (Wilmington, Del.).

FIGS. 3 and 4 also include curves directed to a "Sample 1" wherein the amount of montan wax to synthetic wax is 50% montan wax and 50% synthetic wax; and a "Sample 2" wherein the amount of montan wax to synthetic wax is 0% montan wax and 100% synthetic wax (in other words the component of the release formulation having either synthetic wax or montan wax includes no montan wax in sample 2). Like that described above with respect to SR75, this does not mean that there are not other waxes present in Sample 1 and Sample 2 release formulation. Rather, as used in these Examples, "100% synthetic wax" means that the component of the release formulation that would include montan wax or synthetic wax or a combination of montan and synthetic wax, is solely synthetic wax. Likewise, as used in these Examples, "50% synthetic wax/50% montan wax" means that the component of the release formulation that would include montan wax or synthetic wax or a combination of montan and synthetic wax, is half synthetic wax and half montan wax (while still allowing for other waxes apart from that fraction of the formulation.

Samples 1 and 2 represent exemplary formulations according to principles of the present invention (i.e., release formulations where the montan wax fraction is reduced or eliminated as compared to a typical 100% montan wax formulation). As can be seen from FIGS. 3 and 4 the sole use of synthetic wax, or a mixture of montan and synthetic wax, provides a wax or wax mixture which has very similar performance characteristics to the SR75 (100% montan wax) sample. Comparative data regarding characteristics of the tested release formulations is shown in Table 1, below. And comparative data regarding characteristics of the montan wax (used in "Sample 1" and "SR 75") and the synthetic wax (used in "Sample 1" and "Sample 2") is shown in Table 2, below.

TABLE 1

|  | Sample 1 (including Voelpker synthetic esterified plant wax) | Sample 2 (including Voelpker synthetic esterified plant wax) | SR75 (including Struktol ® Montan Wax OP) |
|---|---|---|---|
| Acid Value | 6.3 | 5.6 | 6-9 |
| Solidification Point | 67 | 68 | 66-73 |
| Color (EBC × 2) | 15 | 15 | max 24 |
| Viscosity 120° C. | 88.4 | 109.0 | 90-130 |
| Viscosity 140° C. | 55.8 | 66.5 | 55-85 |
| Viscosity 146° C. | 49.4 | 57.5 | 47-60 |
| Gross Value | 79.7 | 82.7 | min. 65 |

TABLE 2

|  | Struktol ® Montan Wax OP | Voelpker Esterified Plant Wax (Synthetic) |
|---|---|---|
| Acid Value (mg KOH/g) | 7-25 | 48.4 |
| Dropping Point (° C.) | 93-110 | 81.9 |
| Viscosity (@120° C.) | 200-400 | 13.6 |

Example 2

Comparison of Color Difference

The three wax formulations described above in Example 1 (SR75, Sample 1, and Sample 2) were also tested to determine any level of discoloration in the samples. As described above, one of the drawbacks to current formulations including montan wax is that at the temperatures requires for coating the release layer onto the carrier, the montan wax may discolor (e.g., yellow), thereby detracting from the aesthetic appearance of the label. In order to compare the current formulations (e.g., SR75) with those including 50% montan wax (e.g., Sample 1) and samples including no montan wax (e.g., Sample 2), the three wax formulations from Example 1 were subjected to 2-hour-long dwell times at two different temperatures. In a first test, each of the formulations was held at 300° F. for two hours and then the "Delta E" was measured. Delta E is a common color metric for a difference in color between samples. This difference allows people to quantify the notion of color differences. The Delta E metric was developed by the International Commission on Illumination. In using the metric, a low value is better, and in theory, a Delta E of under 1.0 is generally taken to mean that any color difference between samples is indistinguishable (unless the samples are adjacent to one another). The results of the dwell time at 300° F. are shown in Table 3, below.

TABLE 3

|  | Sample 1 50% montan wax 50% synthetic wax | Sample 2 0% montan wax 100% synthetic wax | SR75 100% montan wax 0% synthetic wax |
|---|---|---|---|
| Temperature | 300° F. | 300° F. | 300° F. |
| Dwell Time | 2 hours | 2 hours | 2 hours |
| Delta E | 0.94 | 0.94 | 1.12 |

A second test was run on the three wax formulations for a dwell time of two hours at a temperature of 340° F. The results of this test are shown in Table 4, below.

TABLE 4

|  | Sample 1 50% montan wax 50% synthetic wax | Sample 2 0% montan wax 100% synthetic wax | SR75 100% montan wax 0% synthetic wax |
|---|---|---|---|
| Temperature | 340° F. | 340° F. | 340° F. |
| Dwell Time | 2 hours | 2 hours | 2 hours |
| Delta E | 2.06 | 1.01 | 2.13 |

As can be seen in comparing the Delta E values in both Table 3 and Table 4, the formulations according to the principles of the present invention (i.e., Samples 1 and 2) outperformed the typically used wax release formulations including montan wax (i.e., SR 75) in terms of color differentiation (i.e., the SR75 release formulation underwent discoloration at both dwell temperatures). In particular, in Table 3, showing a dwell temperature of 300° F., the Delta E notes an indistinguishable color change in both Samples 1 and 2 (which either reduce or eliminate the use of montan wax and replace the fraction of montan reduced or eliminated with synthetic wax according to the principles of the present invention). The typically used SR 75 wax release formulation, however, includes a Delta E of greater than 1, and thus one in which discoloration may be noticeable. Further, as can be seen from Table 4, when subjected to a dwell temperature of 340° F., both Samples 1 and 2 outperform the currently used SR 75 formulation in terms of discoloration. And, as can be further seen in Table 4, the sample including 100% synthetic wax outperforms the 50/50 montan:synthetic wax formulation. Even at these high dwell temperatures, the 100% synthetic formulation (Sample 2) has almost zero (indistinguishable) discoloration. Any substantially indistinguishable discoloration such as this can be taken to mean that the formulation is without discoloration [i.e., "without discoloration" does not necessarily mean that there is absolutely no change in color of the formulation during any heating—only that its level of discoloration is less than, (superior to), that of a typically used current release formulation, such as SR75].

The embodiments of the present invention recited herein are intended to be merely exemplary and those skilled in the art will be able to make numerous variations and modifications to it without departing from the spirit of the present invention. For example, to achieve optimal label integrity and optimal adherence between a label and an article, even under conditions of chemical and/or mechanical degradation, one generally seeks to maximize the adhesion between the label and the article and generally seeks to maximize the interlayer adhesion of the various layers of the label.

Accordingly, the particular types of materials used in the adhesive, ink, and protective lacquer layers may be selected to optimize interlayer adhesion, article adhesion, and/or mechanical and chemical resistance suitable for the intended use of the article. In addition, the types of materials used in the various layers of the label may be selected with an eye towards the particular type of coating and/or printing processes that are to be used in the manufacture of the label. Notwithstanding the above, certain variations and modifications, while producing less than optimal results, may still produce satisfactory results. All such variations and modifications are intended to be within the scope of the present invention as defined by the claims appended hereto.

What is claimed is:

1. A heat transfer label comprising:
   (a) a support portion; and
   (b) a transfer portion over said support portion for transfer of the transfer portion, from the support portion to an article, upon application of heat to the support portion, while the transfer portion is placed into contact with the article;
   wherein said support portion includes a release layer having a synthetic wax, the synthetic wax being an ester of a plant wax obtained by the esterification of waxes of natural plant origin, and the synthetic wax having an acid value between 45 and 55.

2. The heat transfer label of claim 1, wherein the synthetic wax is suitable to withstand temperatures in excess of 300° F. without discoloration.

3. The heat transfer label of claim 1, wherein the synthetic wax has a saponification number between 155 and 165, a dropping point between 75° C. and 85° C., an iodine color between 10 and 20, and a viscosity (120° C. mPa·s) between 10 and 15.

4. The heat transfer label of claim 3, wherein the synthetic wax has an acid value of about 48.4, a saponification number of about 161, a dropping point of about 81.9° C., an iodine color of about 16.3, and a viscosity (120° C. mPa·s) of about 13.6.

5. The heat transfer label of claim 1, wherein the transfer portion includes an ink layer including at least one ink.

6. The heat transfer label of claim 1, wherein the transfer portion includes an adhesive layer.

7. The heat transfer label of claim 1, wherein the transfer portion includes a protective layer.

8. The heat transfer label of claim 1, wherein the synthetic wax is suitable to withstand temperatures in excess of 340° F. without discoloration.

9. A heat transfer label comprising:
   (a) a support portion; and
   (b) a transfer portion over said support portion for transfer of the transfer portion, from the support portion to an article, upon application of heat to the support portion, while the transfer portion is placed into contact with the article;
   wherein said support portion includes a release layer including a synthetic wax being an ester of a plant wax obtained by the esterification of waxes of natural plant origin, said release layer not including montan wax.

* * * * *

UNITED STATES PATENT AND TRADEMARK OFFICE
CERTIFICATE OF CORRECTION

PATENT NO. : 9,511,621 B2
APPLICATION NO. : 13/021265
DATED : December 6, 2016
INVENTOR(S) : Jean-Paul Laprade Page 1 of 1

It is certified that error appears in the above-identified patent and that said Letters Patent is hereby corrected as shown below:

Page 4, FIG. 3,
Line 1 reads "Methode" and should read -- Method --.

Column 1,
Lines 35-36 read "(e.g., carrier sheet and release layer and" and should read -- (e.g., carrier sheet and release layer) and --.

Column 4,
Line 7 reads "for part of all of" and should read -- for part or all of --.

Column 10,
Line 15 reads "maybe" and should read -- may be --.

Column 13,
Line 21 reads "copolymer binder may be employed." and should read -- copolymer binder that may be employed --.

Column 17,
Line 48 reads "requires" and should read -- required --.

Signed and Sealed this
Seventh Day of March, 2017

Michelle K. Lee
*Director of the United States Patent and Trademark Office*